(12) United States Patent
Mantani

(10) Patent No.: US 8,099,790 B2
(45) Date of Patent: Jan. 17, 2012

(54) OPTICAL DISK REPLAY DEVICE

(75) Inventor: Nobunori Mantani, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 993 days.

(21) Appl. No.: 11/951,035

(22) Filed: Dec. 5, 2007

(65) Prior Publication Data

US 2008/0152295 A1 Jun. 26, 2008

(30) Foreign Application Priority Data

Dec. 25, 2006 (JP) ................................. 2006-347014

(51) Int. Cl.
*G06F 17/30* (2006.01)
*G06F 7/04* (2006.01)
*H04N 7/16* (2011.01)

(52) U.S. Cl. .............................................. 726/32; 713/2
(58) Field of Classification Search ...................... 386/46
See application file for complete search history.

(56) References Cited

U.S. PATENT DOCUMENTS

| | | | | | |
|---|---|---|---|---|---|
| 4,246,600 | A | * | 1/1981 | Nakagawa et al. | 348/277 |
| 4,593,458 | A | * | 6/1986 | Adler | 438/413 |
| 5,517,040 | A | * | 5/1996 | Hedman et al. | 257/205 |
| 6,072,901 | A | * | 6/2000 | Balonon-Rosen et al. | 382/167 |
| 6,088,038 | A | * | 7/2000 | Edge et al. | 345/600 |
| 2008/0244257 | A1 | * | 10/2008 | Vaid et al. | 713/2 |

FOREIGN PATENT DOCUMENTS

| | | | |
|---|---|---|---|
| JP | 2000-260675 | * | 8/2000 |
| JP | 2002-072782 | * | 3/2002 |
| JP | 2000-260675 | * | 5/2002 |
| JP | 2003022609 | | 1/2003 |
| JP | 2003-273859 | * | 9/2003 |
| JP | 2005063505 | | 3/2005 |

* cited by examiner

*Primary Examiner* — Kambiz Zand
*Assistant Examiner* — Dant Shaifer Harriman
(74) *Attorney, Agent, or Firm* — Pillsbury Winthrop Shaw Pittman, LLP

(57) ABSTRACT

A replay device includes a flash memory, a setting means, and a test result output unit. A device key for copyright protection is recorded in the flash memory. When a predetermined actuation input is received, the setting means sets the device to a test mode in which it is tested whether or not the device key is recorded. And, when the test mode is set, the test result output means tests whether or not the device key is recorded in the flash memory, and outputs a screen with the result of the test. Moreover, the test result output means displays the test result by changing a background color of the test result screen, according to the presence or absence of the device key.

3 Claims, 5 Drawing Sheets

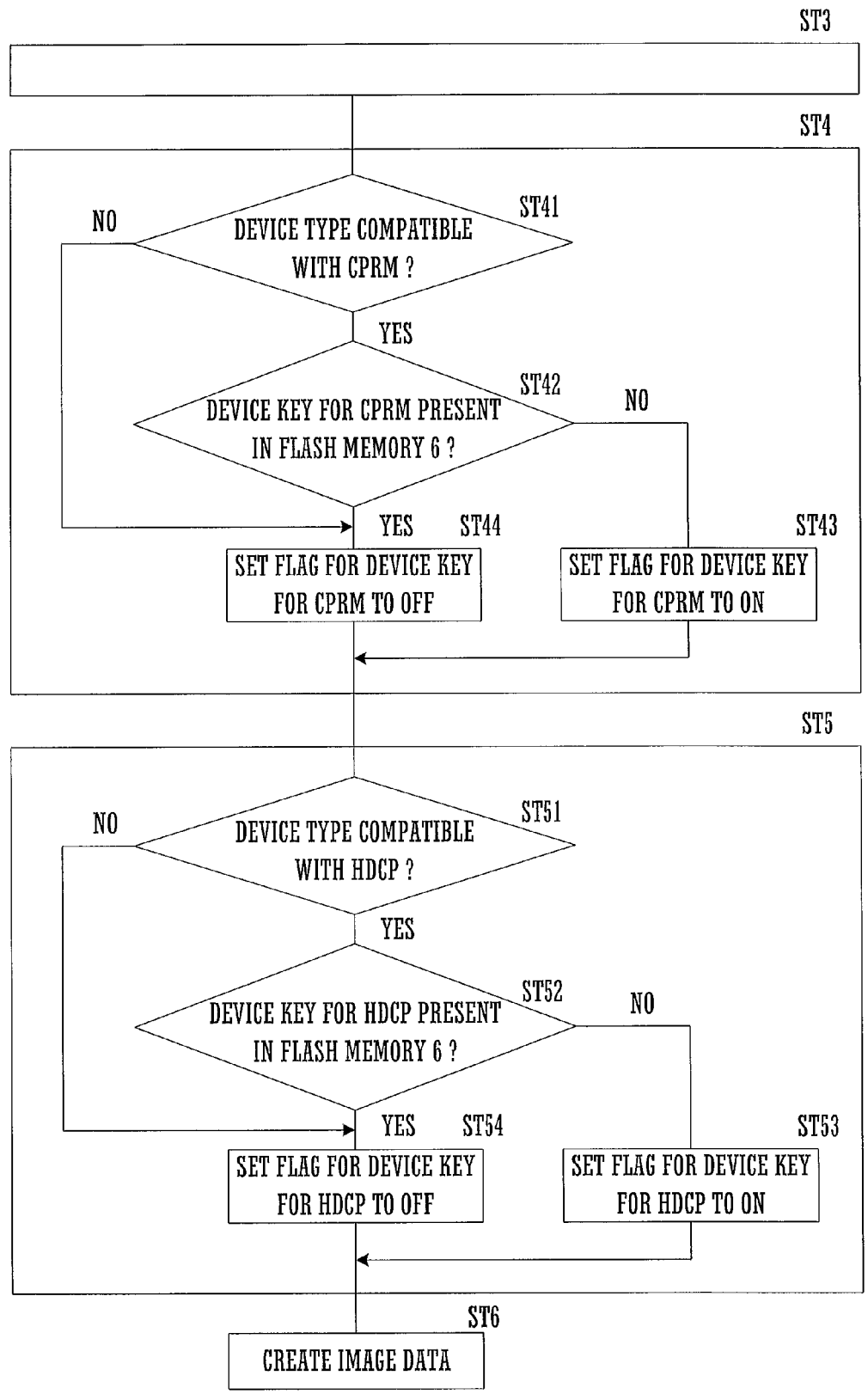

OPTICAL DISK REPLAY DEVICE

CROSS REFERENCE

This Nonprovisional application claims priority under 35 U.S.C. §119(a) on Patent Application No. 2006-347014 filed in Japan on Dec. 25, 2006, the entire contents of which are hereby incorporated by reference.

BACKGROUND OF THE INVENTION

In recent years, from the point of view of copyright protection, device keys have been used on DVD players and DVD recorders and the like, and prevention of secondary distribution by copying has been prevented by encrypting their contents. As such device keys, for example, CPPM (Content Protection for Prerecorded Media), CPRM (Content Protection for Recordable Media), HDCP and the like have been suggested. CPPM and CPRM are systems in which intrinsic identification information—a so called media ID—is generated and encrypted using a device key possessed upon the device side and an MKB (Media Key Block) which is recorded upon the media side. According to such a scheme, a mechanism is provided which makes it impossible to decrypt a disk which has been copied, since its media ID is different. On the other hand, HDCP (High-bandwidth Digital Content Protection system) is a system in which encryption is performed when outputting a digital signal via a digital interface such as DVI or HDMI or the like, and in which it is made impossible to display an image of protected contents if both sides are not compatible with HDCP.

Now, these device keys are purchased by the maker of the device from license supply companies. For each of the device keys it is necessary to install an ID, all of which are different for each device. In the manufacturing process for a DVD player or the like, after having assembled the main circuit board, these device keys are recorded in a flash memory upon this main board, and thereafter a test is performed to ensure that the keys are properly recorded in the flash memory. However, even though this type of test upon the main board is performed, when testing is performed in a final testing process during the stage in which the main board has been installed in is the DVD player itself, sometimes it is found that the device keys have not been installed properly. Thus, in such a final testing process, the replay device is put into a device keys testing mode in which the serial numbers of the device keys are displayed, in order to test whether or not the device keys have been properly recorded.

Furthermore, in the prior art, an optical disk replay device has been described (in Japanese Laid-Open Patent Publication 2005-63505) which is endowed with a function of specifying the device key in question, when some malfunction has occurred in processing for which a device key is required. Moreover a replay device has been disclosed (in Japanese Laid-Open Patent Publication 2003-22609) which detects in a simple and easy manner whether or not the device key information is normal, and which imposes a limitation upon operation if an anomaly has occurred.

However, even if testing is performed as described above, there is still a fear that simply displaying the serial numbers of the device keys may not be sufficient to prevent the operator who is performing the test overlooking a case in which a device key is not recorded. If the optical disk replay device is (undesirably) shipped just as it is with some device key not being properly recorded, then there is a danger that the product may be returned by the user with a justifiable claim that some encrypted disk cannot be replayed.

Accordingly, the present invention attempts to solve these problems with the prior art, and takes as its objective to provide a replay device which is endowed with a function by which it is possible more reliably to test whether or not device keys for copyright protection have been properly recorded in the digital media replay device or recording and replay device during the manufacturing process.

SUMMARY OF THE INVENTION

The replay device according to the present invention includes a flash memory, a setting means, and a test result output means.

A device key for copyright protection is recorded in the flash memory.

When a predetermined actuation input is received, the setting means sets the device to a test mode in which it is tested whether or not the device key is recorded.

And, when the test mode is set, the test result output means tests whether or not the device key is recorded in the flash memory, and outputs a screen with the result of the test.

Moreover, the test result output means displays the test result by changing a background color of the test result screen, according to the presence or absence of the device key.

BRIEF DESCRIPTION OF THE DRAWINGS

FIG. 5 is a flow chart showing certain steps of the flow chart of FIG. 4 in more detail.

DETAILED DESCRIPTION OF THE INVENTION

Figure 1:
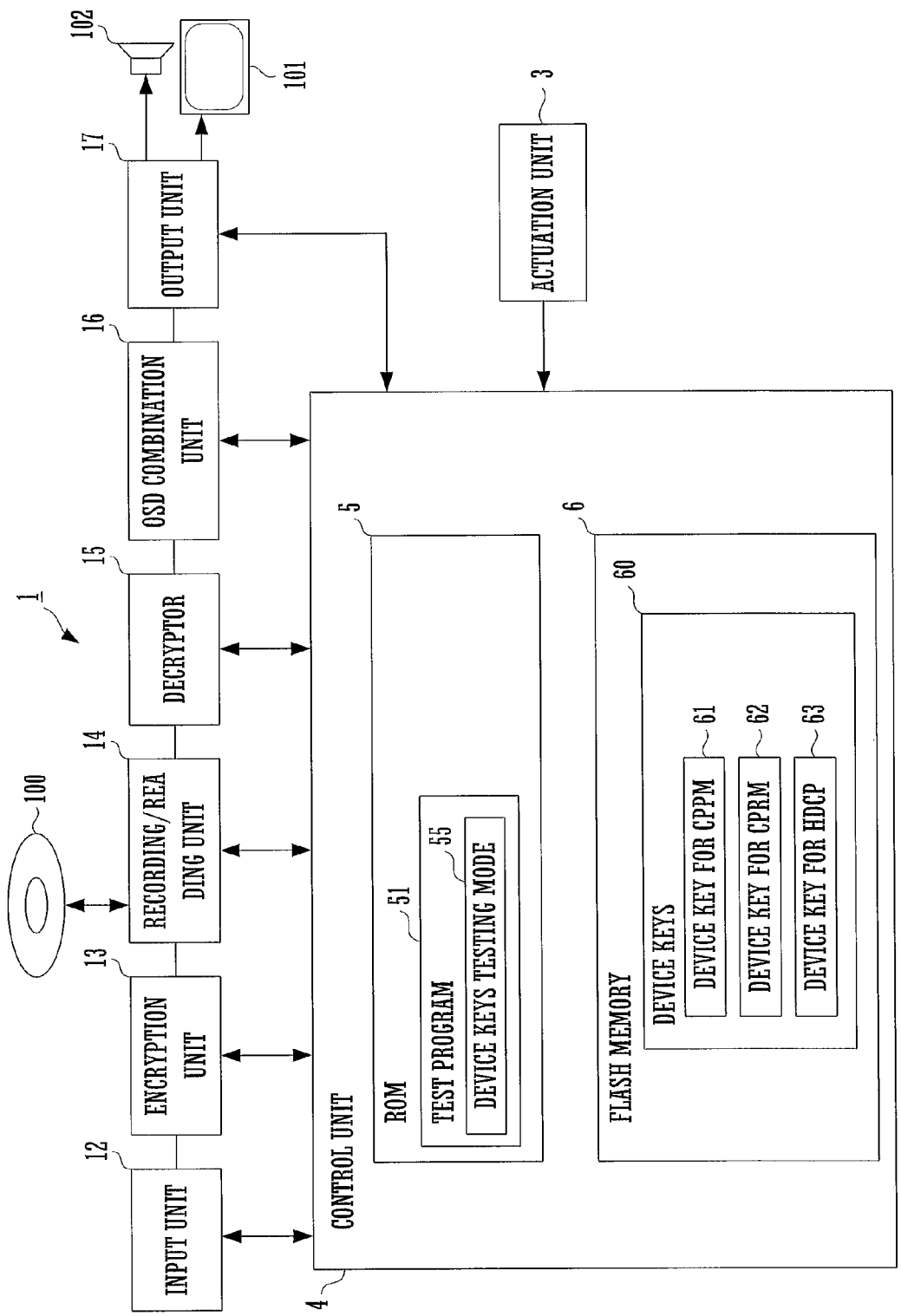
FIG. 1 is a block diagram showing the main structure of a DVD recorder which is an embodiment of the present invention.

FIG. 1 is a block diagram showing the structure of the main portion of a DVD recorder 1 which is an embodiment of the present invention. The DVD recorder 1 of this embodiment performs recording of works upon DVDs and replay of works recorded upon DVDs. It should be understood that a DVD 100 which can be loaded into this DVD recorder 1 of this embodiment is a DVD-ROM or the like.

A video signal and an audio signal in digital format or in analog format are inputted to an input unit 12. That is, a television broadcast signal in analog format which has been received by an antenna (not shown in the figures) or a video signal and an audio signal in analog or digital format which have been inputted from a VHS tape drive or some other type of audio-visual device are inputted.

An encryption unit 13 comprises an A/D converter and an encryptor. It converts a video signal and an audio signal in analog format, which have been inputted by the input unit 12, into digital signals. It should be understood that, if these signals are inputted in digital format, this conversion is not performed. The encryptor encrypts the digital video signal and the digital audio signal. And the encryption unit 13 outputs this encrypted data to a recording/reading unit 14.

In this recording/reading unit 14, processing to record the data which has been generated by the encryption unit 13 upon a DVD 100, or processing to read recorded data for a work which is recorded upon a DVD 100, is performed.

The recording/reading unit 14 comprises a pickup head (not shown in the figures) which irradiates laser light upon the DVD 100 and detects the light reflected therefrom, a servo control unit (also not shown in the figures) which performs focus servo control and tracking servo control to control the irradiation position at which this laser light is irradiated upon the DVD 100, and so on. When recording data, the recording/reading unit 14 performs recording control to modulate the laser light irradiated upon the DVD 100 based upon the data which is to be recorded upon the DVD 100. Furthermore, when reading data, a RF signal which has been obtained by reading the pits recorded upon the DVD 100 and amplifying the result is inputted to the decryptor 15. Moreover, the decryptor 15 extracts video data and audio data from the RF signal which has been read by the recording/reading unit 14.

The decryptor 15 decrypts the data which has been read by the recording/reading unit 14, D/A converts this decrypted video data and audio data, and inputs the result to an OSD combination unit 16.

The OSD (On Screen Display) combination unit 16 creates a video signal which displays various types of information, such as setting information for the main device and soon. Furthermore, when a video signal is being outputted from the decryptor 15, it is combined with this video signal from the OSD combination unit 16. Moreover sometimes, according to circumstances, these video signals are not combined together, but only the information video signal is outputted. In this embodiment of the present invention, in particular, during the execution of a test program 50 which will be described hereinafter, a predetermined screen display is performed according to the test state of device keys 60. It should be understood that the details of this screen display will be described hereinafter with reference to FIG. 2.

An output unit 17 D/A converts the recorded data which has been processed by the decryptor 15, and outputs the result as a replay signal. A display device 101 which displays an image and a speaker 102 which emits audio are connected to this output unit 17. The output unit 17 outputs a video signal and an audio signal, mutually synchronized, based upon the video data which has been inputted from the decryptor 15.

An actuation unit 3 receives input actuation for the main body of this device. For example, the actuation unit 3 receives input of commands for recording (i.e. for recording a video signal upon a DVD 100) and input of commands for making appointments for such recording.

A control unit 4 comprises a CPU and a ROM 5 and a flash memory 6 for storing control data, and recognizes actuation inputs received by the actuation unit 3, controls the operation of the various sections of this device as commanded thereby, and performs predetermined processing upon these actuation inputs. A test program 51 is recorded in the ROM 5. Furthermore, various device keys 60 are recorded in the flash memory 6. When a predetermined actuation input is received, the control unit 4 performs various types of tests by executing the test program 50. For example, in a device keys testing mode 55, the control unit 4 decides whether device keys 60 are recorded in the flash memory 6.

These device keys 60 are used as encryption keys for copyright protection, for preventing copying of digital contents. Moreover, these device keys 60 are purchased by the maker of this device from license supply companies. As such device keys 60, a device key 61 for CPPM, a device key 62 for CPRM, and a device key 63 for HDCP are recorded in the flash memory 6. In CPPM, encryption of contents is performed using a "media key" which is generated from a MKB (Media Key Block) which is different for each disk and a device key on the device side, an "album ID" which is different for each album, and CCI (Copy Control Information). The MKB and the album ID are recorded in a read region upon the DVD 100, and it is not possible to copy these onto another DVD. And CPRM is the same as CPPM, except for the feature that it is used upon a recordable DVD.

On the other hand, HDCP (High-bandwidth Digital Content Protection system) is used for encryption when outputting to a digital interface such as DVI or HDMI or the like. HDCP is for encrypting and protecting the signal when transmitting and receiving a signal to or from such a digital interface, so that an image of protected contents is not displayed if both sides are not compatible with HDCP.

The display device 101 and the speaker 102 are connected to this DVD recorder 1. The display device 101 displays an image based upon the replay video signal outputted from the output is unit 17. And the speaker 102 converts the audio signal outputted from the output unit 17 to sound, which it emits.

Next, using FIG. 2, examples of screen display during the device keys testing mode 55 will be explained. The display 101A of the display example shown in FIG. 2(A) is a test screen for the device key for CPPM 61, and shows the case in which the device key for CPPM 61 is indeed recorded in the flash memory 6. In this case, the entire background 610A is colored blue. On the other hand, the display 101B of the display example shown in FIG. 2(B) is also a test screen for the device key for CPPM 61, but shows the case in which no such device key for CPPM 61 is recorded in the flash memory 6. In this case, the entire background 610B is colored red.

And FIGS. 2(C) and 2(D) show a case in which all three of the keys 61 through 63 are tested simultaneously. In FIG. 2(C), the screen 101C of the display device 101 is divided into three backgrounds 611, 621, and 631, and these respectively indicate the storage states of the keys 61 through 63 for CPPM, CPRM, and HDCP. In the example shown in FIG. 2(C), a case is shown in which the device key for CPPM 61 and the device key for HDCP 63 are indeed recorded in the flash memory 6, but no device key for CPRM 62 is recorded in the flash memory 6. Among these device keys 60, since the ones thereof which are indeed recorded in the flash memory 6, i.e. the device key for CPPM 61 and the device key for HDCP 63, pass the test, accordingly, on the DVD recorder 1, their backgrounds 611 and 631 are colored blue. On the other hand, since the one of these device keys 60 which is not recorded in the flash memory 6, i.e. the device key for CPRM 62, fails the test, accordingly its background 621 is colored red. Due to this, the person performing the testing is able simply and easily to check whether all of the device keys 60 are indeed recorded in the flash memory 6, or whether any of them is not recorded in the flash memory 6. Since, in this example, the backgrounds 611, 621, and 631 are all displayed together as lined up on the screen, the tester is able to check for whether any of the device keys 60 have not been properly recorded in the flash memory 6, all at the same time.

Furthermore, in the alternative example shown in FIG. 2(D), in addition to the above, code numbers are also shown for those ones of the device keys which have indeed been properly recorded in the flash memory 6.

Next, a first example of processing during the device keys testing mode of this DVD recorder 1 will be explained using the flow chart shown in FIG. 3. This processing corresponds to the screen display shown in FIGS. 2(A) and 2(B), and shows the case in which testing is performed for only a single key.

In a step ST1, when actuation input has been received, the control unit 4 decides whether or not a predetermined actuation input for performing the test program 51 has been performed, and the flow of control waits (NO in the step ST1) until this actuation input is performed. When this actuation input becomes present (YES in the step ST1), the flow of control proceeds to a step ST2, and the test program 51 is executed. During the operation of this test program 51, in the step ST2, the control unit 4 goes into a waiting state for actuation input in which it decides whether or not the device keys testing mode 55 has been selected, i.e. the flow of control waits (NO in the step ST2) until such an actuation input is performed. However, when the device keys testing mode 55 has been selected, the flow of control proceeds to a step ST3.

It should be understood that, in the step ST2, it would also be acceptable to arrange to output upon the screen a display for receiving selection of a predetermined testing process; and it would also be acceptable to omit the step ST2, and to enter the device keys testing mode 55 directly.

In the step ST3, the processing of steps ST31 through ST34 is performed, which is processing for providing the backgrounds for the screen displays 101A and 101B. In the steps ST31, a decision is made as to whether or not the DVD recorder 1 is of a type which is compatible with CPPM. If the DVD recorder 1 is not of a type which is compatible with CPPM (NO in the step ST31), then there is no trouble in the first place with this test 55 of the device keys testing mode, so the test is passed. Accordingly the flow of control is transferred to the step ST34, and the background of the screen is colored blue, as shown by 610A in FIG. 2. On the other hand, if the DVD recorder 1 is of a type which is compatible with CPPM (YES in the step ST31), then a decision is made as to whether or not the device key for CPPM 61 is indeed recorded in the flash memory 6. If indeed the device key for CPPM 61 is recorded in the flash memory 6 (YES in the step ST32), then this test 55 of the device keys testing mode is passed. Accordingly the flow of control is transferred to the step ST34, and the background of the screen is colored blue, as shown by 610A in FIG. 2. However, if no such device key for CPPM 61 is recorded in the flash memory 6 (NO in the step ST32), then this test 55 of the device keys testing mode is failed. Accordingly, in the next step ST33, as shown by 610B in FIG. 2(B), the background of the screen is colored red, as shown by 610B in FIG. 2.

Although, in the above, an example was shown in which the device key for CPPM 61 was tested, the present invention is not limited to only this key being tested; it would also be acceptable to arrange to test for some other key, and it would also be acceptable to arrange to test for a plurality of keys in sequence.

Figure 3:
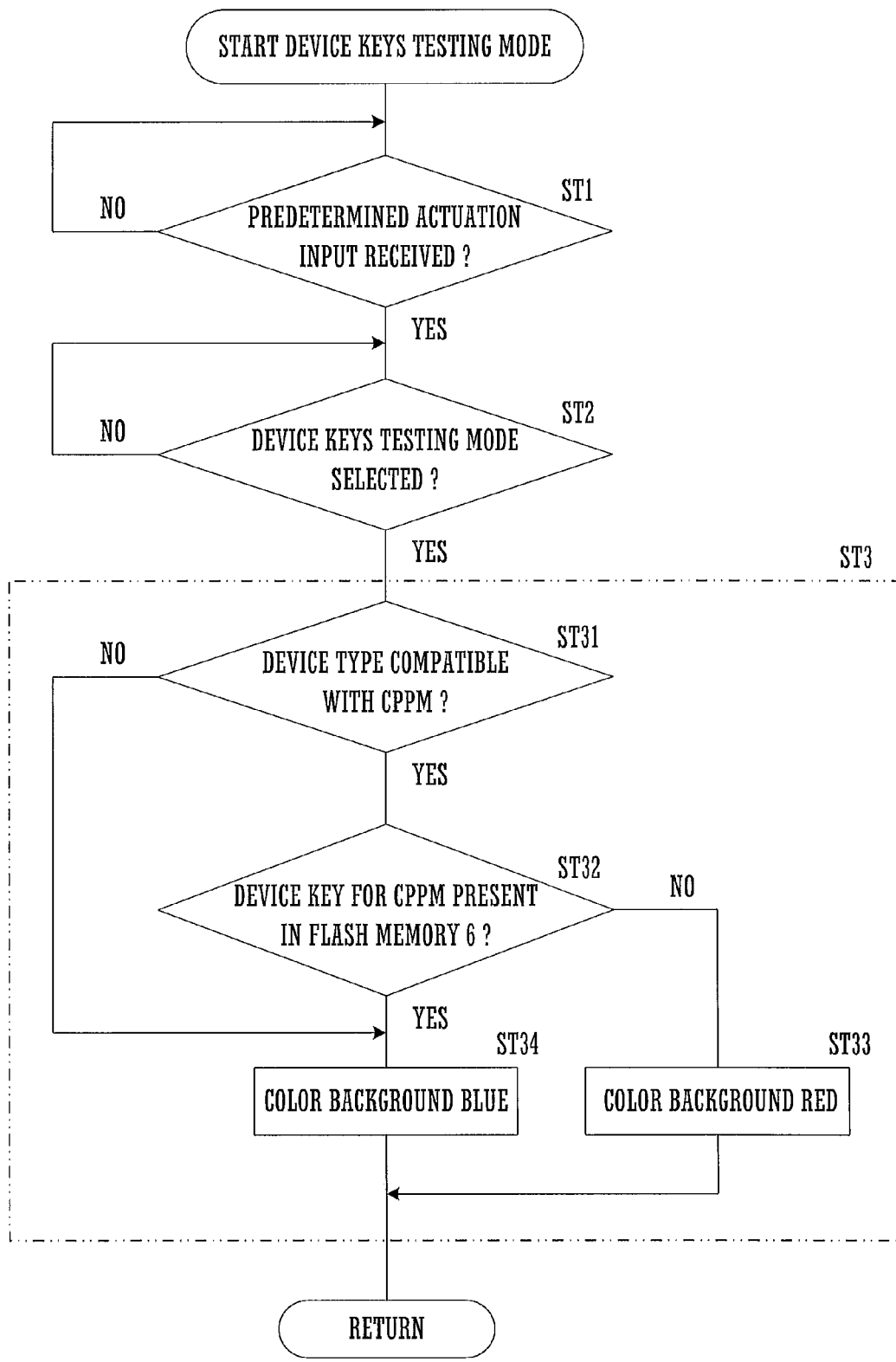
FIG. 3 is a flow chart showing the operation of this DVD recorder according to the present invention, in this device keys testing mode.
Figure 4:
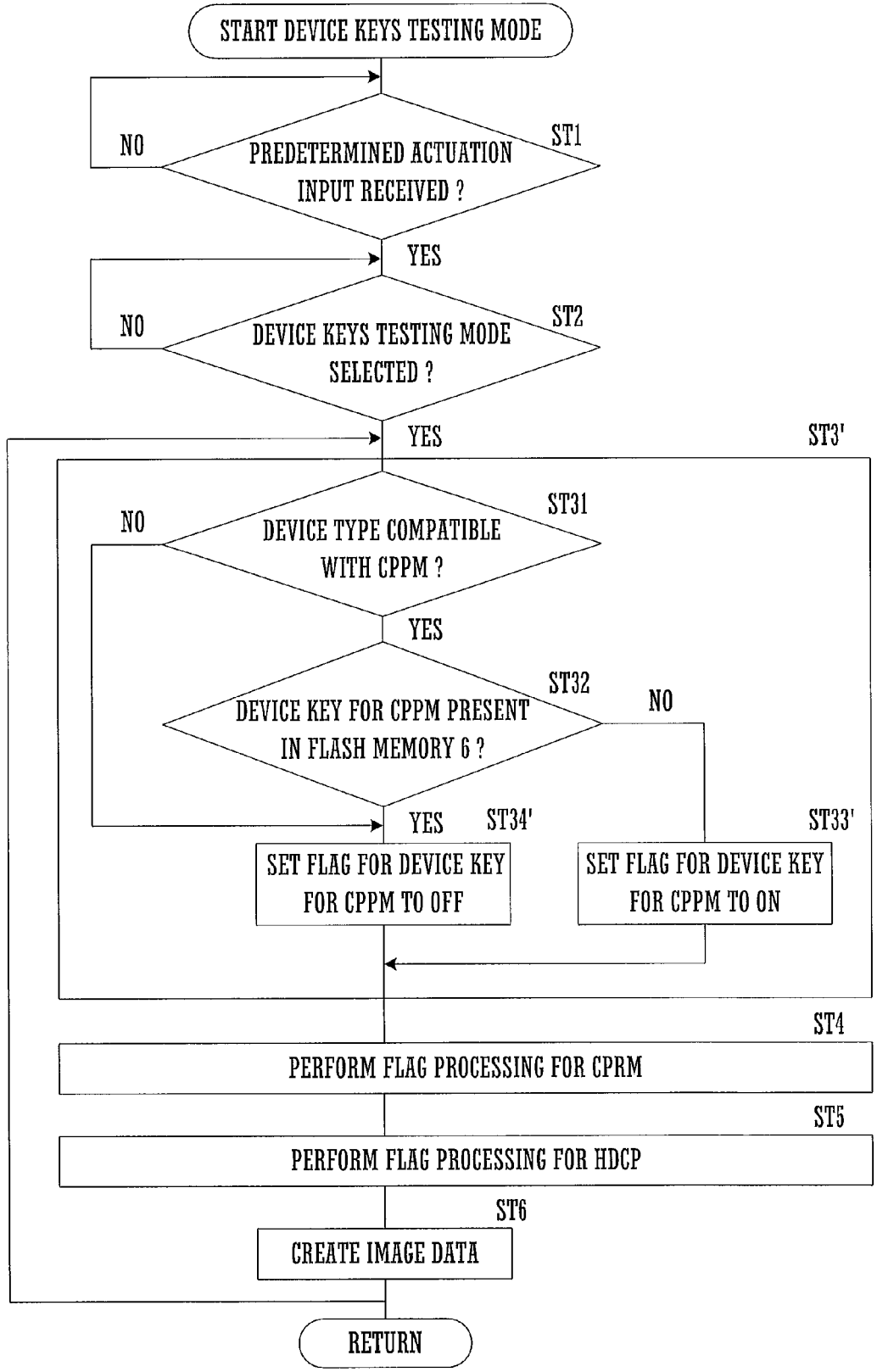
FIG. 4 is another flow chart showing the operation of this DVD recorder according to the present invention, in its device keys testing mode.

Next, a second example of processing during the device keys testing mode of this DVD recorder 1 will be explained using the flow charts shown in FIGS. 4 and 5. FIG. 4 is a figure showing the overall flow of this processing, while FIG. 5 is a figure showing the details of the processing in the steps ST4 and ST5 of FIG. 4. It should be understood that this processing corresponds to the screen displays shown in FIGS. 2(C) and 2(D), and shows the case in which all three of the keys 61 through 63 are tested at the same time. Since the steps ST1 and ST2 are the same as in FIG. 3 and the steps ST31 and ST32 make the same decisions, the explanation given above is applicable.

In steps ST3 through ST5, a decision is made as to whether or not the various device keys 60 are recorded in the flash memory 6, and corresponding flags are set. This setting of flags in this manner in advance is in order to test for the presence or absence of each of the device keys 60 in advance, and to store this information, so as to be able to set all three of the backgrounds simultaneously.

The step ST33' of ST3' is the branch from the step ST32 in the case of NO. In this step ST33', data which sets a flag for the device key for CPPM 61 to ON is stored in a memory within the control unit 4, not shown in the figures (instead of this, it would also be acceptable to store this data in the flash memory 6, and the same hereinafter).

The step ST34' of ST3' is the branch from the step ST31 in the case of YES, and the branch from the step ST32 in the case of YES. In this step ST34', data which sets the flag for the device key for CPPM 61 to OFF is stored in the memory within the control unit 4, not shown in the figures.

The steps ST4 and ST5 in FIG. 5 perform similar operations for the other two device keys 62 and 63. Since steps ST41 and ST51 correspond to the step ST31, while steps ST42 and ST52 correspond to the step ST32, accordingly the explanation given above will be applicable, *mutatis mutandis*.

The step ST43 of ST4 is the branch from the step ST42 in the case of NO. In this step ST43, data which sets a flag for the device key for CPRM 62 to ON is stored in the memory within the control unit 4, not shown in the figures.

The step ST44 of ST4 is the branch from the step ST41 in the case of YES, and the branch from the step ST42 in the case of YES. In this step ST44, data which sets the flag for the device key for CPRM 62 to OFF is stored in the memory within the control unit 4, not shown in the figures.

The step ST53 of ST5 is the branch from the step ST52 in the case of NO. In this step ST53, data which sets a flag for the device key for HDCP 63 to ON is stored in the memory within the control unit 4, not shown in the figures.

The step ST54 of ST5 is the branch from the step ST51 in the case of YES, and the branch from the step ST52 in the case of YES. In this step ST54, data which sets the flag for the device key for HDCP 63 to OFF is stored in the memory within the control unit 4, not shown in the figures.

Figure 2:
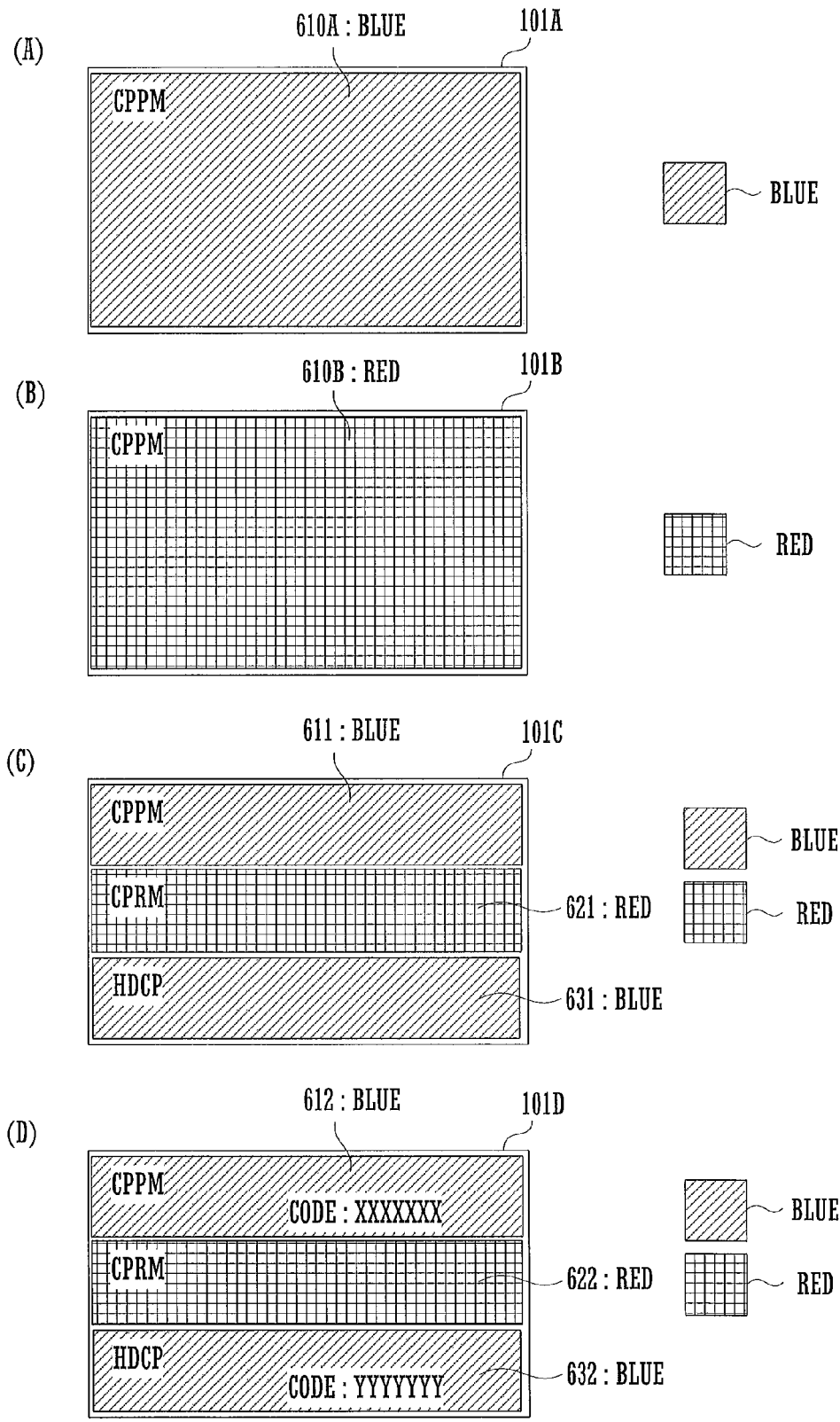
FIG. 2 is an example of a screen display of this DVD recorder according to the present invention, in a device keys testing mode.

In a step ST6, based upon the above flags set in the steps ST3 through ST5, the control unit 4 creates, for example, image is data for the screens 101C and 101D shown in FIG. 2, and outputs this data to the OSD combination unit 16. For each of the flags which has been set to ON, the background is made to be red (for example, 621 and 622).

It should be understood that, when providing the display 101D of FIG. 2(D), the code numbers of the various types of device key checked in the steps ST34', ST44, and ST54 are all stored in the memory within the control unit 4. Thereafter the flow of control returns to the step ST3, and the image which was created in the step ST6 is updated at predetermined intervals. By performing updating at predetermined intervals in this manner, any one of the device keys 60 which is not present is shown in red. Furthermore since, if and when that one of the device keys 60 has been recorded, then its flag is updated, and the color of its corresponding background 611, 621, or 631 is changed from red to blue, accordingly the person performing the testing is able clearly to confirm that this one of the device keys 60 has now been recorded; and therefore it is possible to eliminate any chance of the device being shipped just as it is with some one of the device keys 60 not being recorded therein, which would be a serious manufacturing error.

It should be understood that the sequence shown in FIG. 2 for the backgrounds for CPPM, CPRM, and HDCP is not limitative of the present invention; it would also be acceptable to arrange them in some other sequence, and it would also be acceptable to arrange them horizontally. It is also not necessary to make decisions for all of CPPM, CPRM, and HDCP; if the device 1 is not compatible with one of these, it need not be displayed. Furthermore it is not necessary to divide the background into three sections as shown in FIG. 2; it would also be acceptable to display these three sections alternatingly by time division. Moreover although, in FIG. 2, the case of using the colors red and blue was shown, other colors than red and blue could also be used.

Furthermore although, in the above, the DVD recorder 1 which is capable of recording data was explained as an embodiment of the present invention, it is not necessary for a device according to the present invention to be capable of recording data; the present invention may also be applied to a device which is dedicated only to replay. With such a device dedicated to replay, it is not necessary to record any device key for CPRM 62 in the flash memory for use with a recordable type DVD 100.

What is claimed is:

1. An optical disk replay device, comprising: a flash memory in which a device key is recorded, the device key being used for preventing an illegal copy of digital contents data recorded upon an optical disk in view of copyright protection;
    replay means for:
        reading encrypted digital contents data recorded upon the optical disk, and decrypting the encrypted digital contents data by use of the device key recorded in the flash memory, and
        replaying the decrypted digital contents data;
    control means for which, when receiving a predetermined actuation input sets the optical disk replay device to a test mode for testing whether or not the device key is recorded in the flash memory; and
    test result output means for:
        when the test mode of the optical disk replay device is set, testing whether or not the device key is recorded in the flash memory; and
        outputting to a display device an image signal showing a screen with a test result indicating presence or absence of the device key,
        wherein the test result output means changes a background color of the screen with the test result which is displayed on the display device, according to the presence or absence of the device key.

2. The optical disk replay device according to claim 1, wherein the test result output means: tests for the presence or absence of a plurality of device keys;
    divides the screen with the test result into the same number of sections as the number of the device keys; displays the divided screen; and changes a background color of each of the divided sections according to the presence or absence of a corresponding device key of the device keys.

3. The optical disk replay device according to claim 2, wherein the test result output means: continues to display a predetermined background color while the corresponding device key of the device keys is not recorded in the flash memory; and
    changes the predetermined background color when the corresponding device key of the device keys has been recorded in the flash memory.

* * * * *